United States Patent
Lewandowski et al.

(10) Patent No.: US 11,867,291 B2
(45) Date of Patent: Jan. 9, 2024

(54) PRESS-FIT COMPONENTS DISASSEMBLY TOOLING AND PROCESS

(71) Applicant: PRATT & WHITNEY CANADA CORP., Longueuil (CA)

(72) Inventors: Mariusz Lewandowski, Płock (PL); Grzegorz Mokrzyński, Rzeszów (PL); Gabriel Cyr-Carrier, Montreal (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 17/804,313

(22) Filed: May 27, 2022

(65) Prior Publication Data

US 2023/0383844 A1  Nov. 30, 2023

(51) Int. Cl.
*F16J 15/3268* (2016.01)
*B23P 19/02* (2006.01)

(52) U.S. Cl.
CPC ......... *F16J 15/3268* (2013.01); *B23P 19/025* (2013.01)

(58) Field of Classification Search
CPC .... F16J 15/3268; B23P 19/025; B23P 19/084; B23P 19/02; F05D 2230/70; F05D 2230/72
See application file for complete search history.

(56) References Cited

U.S. PATENT DOCUMENTS

| 3,409,970 A | 11/1968 | De Pietra |
| 3,880,604 A * | 4/1975 | Hawkins ............... B23P 19/025 29/283 |

* cited by examiner

*Primary Examiner* — Christopher J Besler
(74) *Attorney, Agent, or Firm* — NORTON ROSE FULBRIGHT CANADA LLP

(57) ABSTRACT

A tool and an associated process for removing a press-fit component from an associated engine component, wherein the engine component is pushed in a first axial direction while the press-fit component is restrained from axially moving in the first axial direction.

7 Claims, 6 Drawing Sheets

PRESS-FIT COMPONENTS DISASSEMBLY TOOLING AND PROCESS

TECHNICAL FIELD

The application relates generally to press-fit components, and more particularly, to tooling and processes for disassembling press-fit components.

BACKGROUND OF THE ART

Press-fit components, such as lab seals and shaft collars, utilize an interference or press fit between the inner diameter surface and an outer diameter surface of the mating components. Overtime, such press-fit components may need to be replaced or serviced. Non-destructive disassembly of the components can be challenging. There is, thus, a continued need for improved press-fit disassembly processes and tooling.

SUMMARY

In one aspect, there is provided a tool for disengaging press-fit components, the tool comprising: a stopper engageable axially behind a first component of the press-fit components to prevent axial movement of the first component in a first direction; and a pusher axially engageable with a second component of the press-fit components for transferring a pushing force to the second component in the first direction.

In another aspect, there is provided a tool for removing a seal from an engine component, wherein an interference fit is provided between an inner diameter (ID) surface of the seal and an outer diameter (OD) surface of the engine component, the ID surface and the OD surface extending circumferentially around a central axis, the tool comprising: a support defining an annular seat offering an axial abutment for the seal around the outer diameter surface of the engine component, the axial abutment restraining axial movement of the seal in a first axial direction; and a pusher axially engageable with the engine component to transfer a pushing force to the engine component in the first axial direction.

In a further aspect, there is provided a method for removing a lab seal from a turbine disc, wherein an interference fit is provided between an inner diameter (ID) surface of the lab seal and an outer diameter (OD) surface of the turbine disc, the ID surface and the OD surface extending circumferentially around a central axis, the method comprising: blocking the lab seal against axial movement in a first axial direction relative to the turbine disc; and axially pushing the turbine disc out of engagement from the lab seal by applying a pushing force against the turbine disc in the first direction.

In a still further general aspect, there is provided a method of removing a press-fit seal from an engine component having a central axis, the method comprising: restraining the press-fit seal from axially moving in a first axial direction; and applying a pushing force on the engine component in the first axial direction.

DESCRIPTION OF THE DRAWINGS

Reference is now made to the accompanying figures in which.

DETAILED DESCRIPTION

As required, detailed embodiments of the present technology are disclosed herein; however, it is to be understood that the disclosed embodiments are merely exemplary of the technology, which can be embodied in various forms. Therefore, specific structural and functional details disclosed herein are not to be interpreted as limiting, but merely as a basis for the claims and as a representative basis for teaching one skilled in the art to variously employ the present technology in virtually any appropriately detailed structure. Further, the terms and phrases used herein are not intended to be limiting; but rather, to provide an understandable description of the technology.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly.

Figure 1:
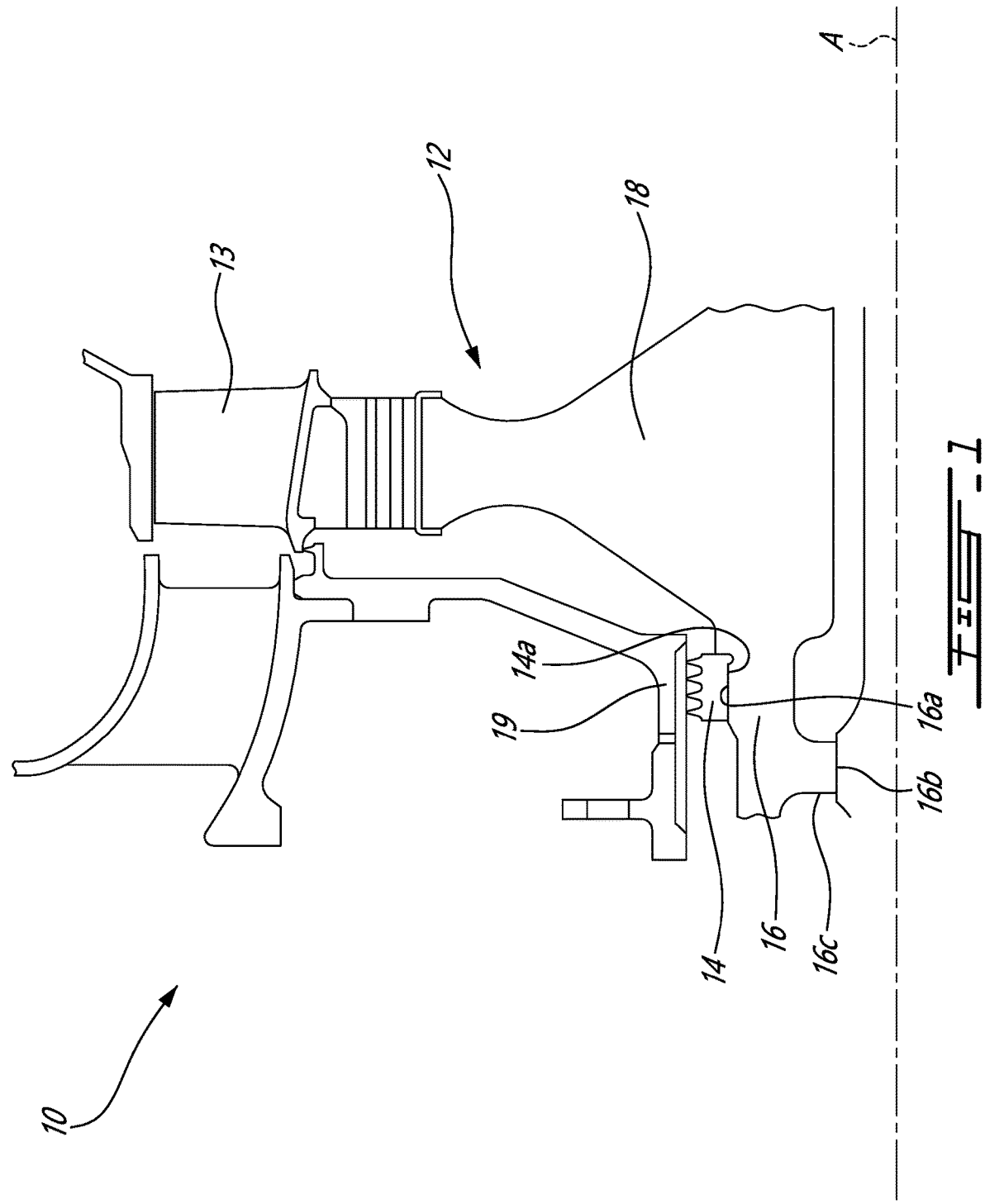
FIG. 1 is a schematic cross section view of a turbine section of an aircraft engine illustrating a labyrinth seal press fit on a turbine disc.

Many aircraft engine components, including bushings, bearings, shaft collars, rotors, and seals, are assembled with an interference fit (also know as press or friction fit). FIG. 1 illustrates an example of a press-fit assembly in the context of an aircraft engine. More particularly, FIG. 1 illustrates a turbine section 10 of an aircraft engine including a turbine disc 12 carrying a circumferential array of turbine blades 13, the disc 12 mounted for rotation about a central axis (A). A labyrinth seal 14 (hereinafter referred to as a lab seal 14) is press fit on a spigot 16 extending axially forwardly from a hub 18 of the turbine disc 12 to provide a rotational sealing interface between the rotating turbine disc 12 and an adjacent surrounding static runner surface of a structure 19 of the turbine section 10. The seal inner diameter is press fit onto the spigot outer diameter. In other words, an interference fit is provided between an inner diameter (ID) surface 14a of the lab seal 14 and an outer diameter (OD) surface 16a of the spigot 16 of the turbine disc 12.

Removal of such a press-fit lab seal 14 from the turbine disc 12 may be challenging. For instance, if the teeth of the lab seal 14 are worn down, there might not be a sufficient surface area for a puller tool to properly grab the lab seal 14 and axially pull the lab seal 14 out from the turbine disc 12. In addition, the pulling action of the puller on the lab seal 14 may potentially damage the lab seal teeth. Furthermore, if the lab seal 14 or the pulling force on the lab seal 14 is not purely coaxial to the turbine disc axis, there is a risk of introducing residual stress into the disc 12 and/or the lab seal 14 while the lab seal 14 is being pulled out. How to efficiently achieve non-destructive disassembly for such press-fit components is, thus, a subject of concerns.

Figure 2:
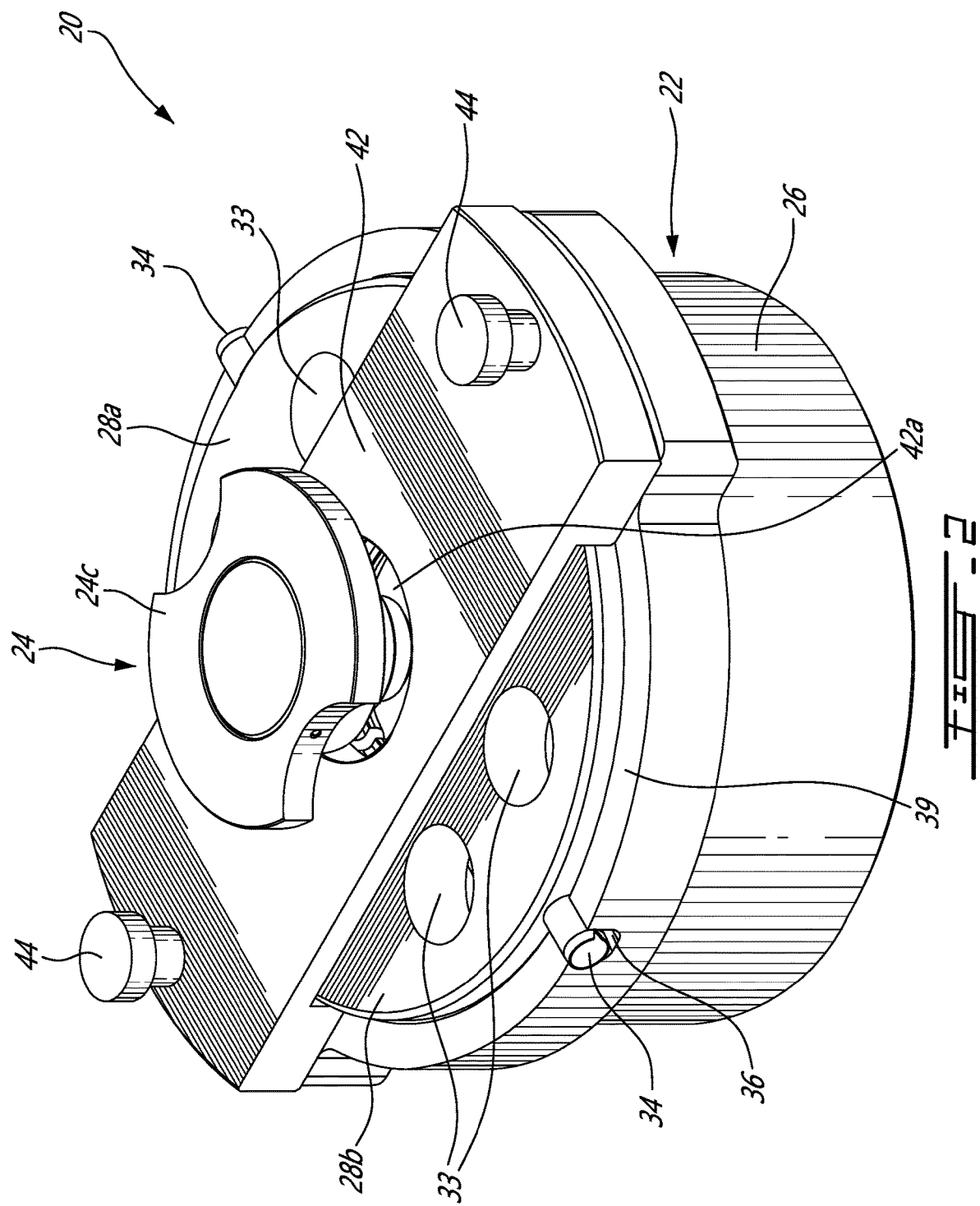
FIG. 2 is an isometric view of a tool for removing the labyrinth seal from the turbine disc.
Figure 3:
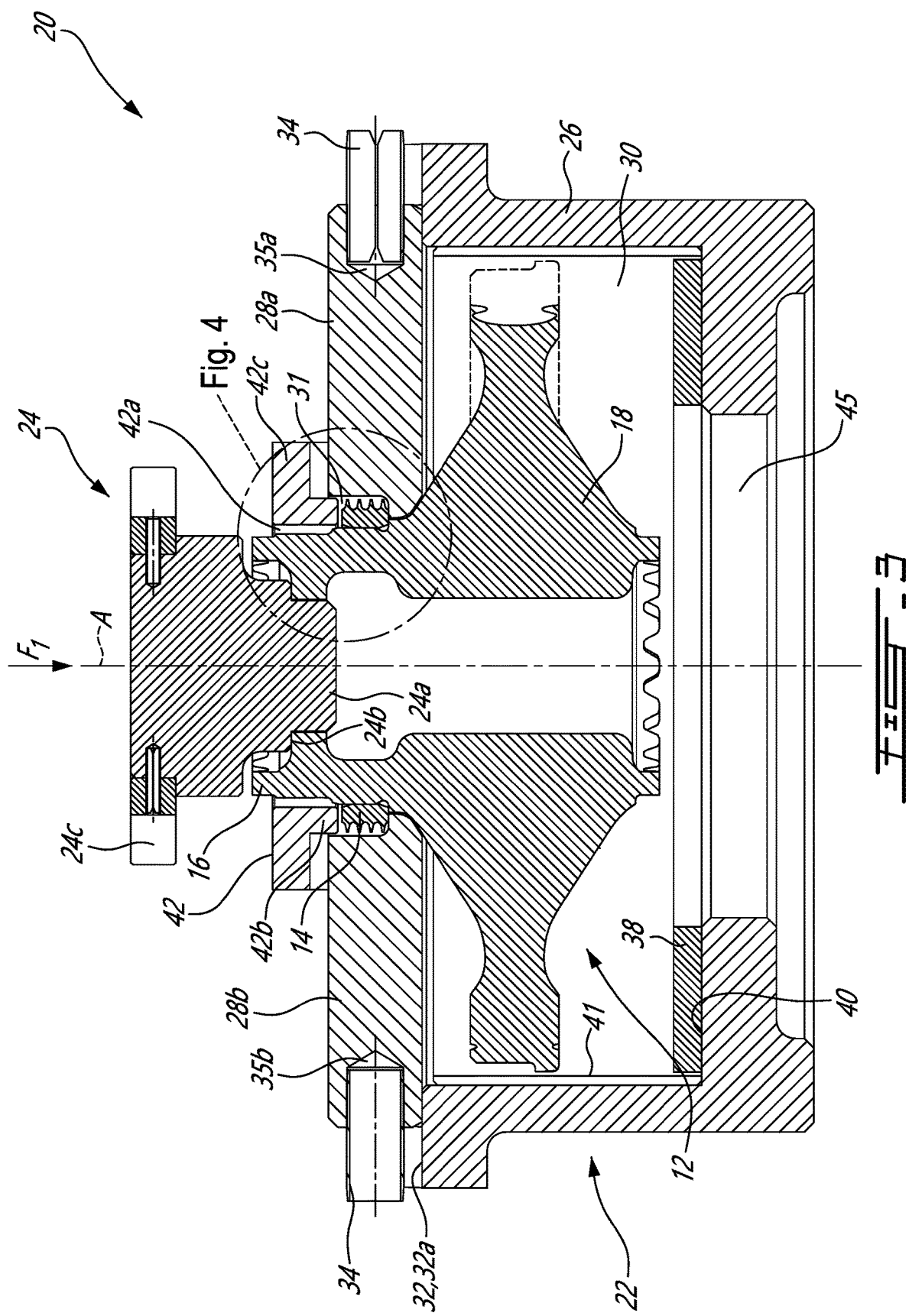
FIG. 3 is a cross-section view of the tool shown in FIG. 2 with the turbine disc and labyrinth seal installed thereon.
Figure 4:
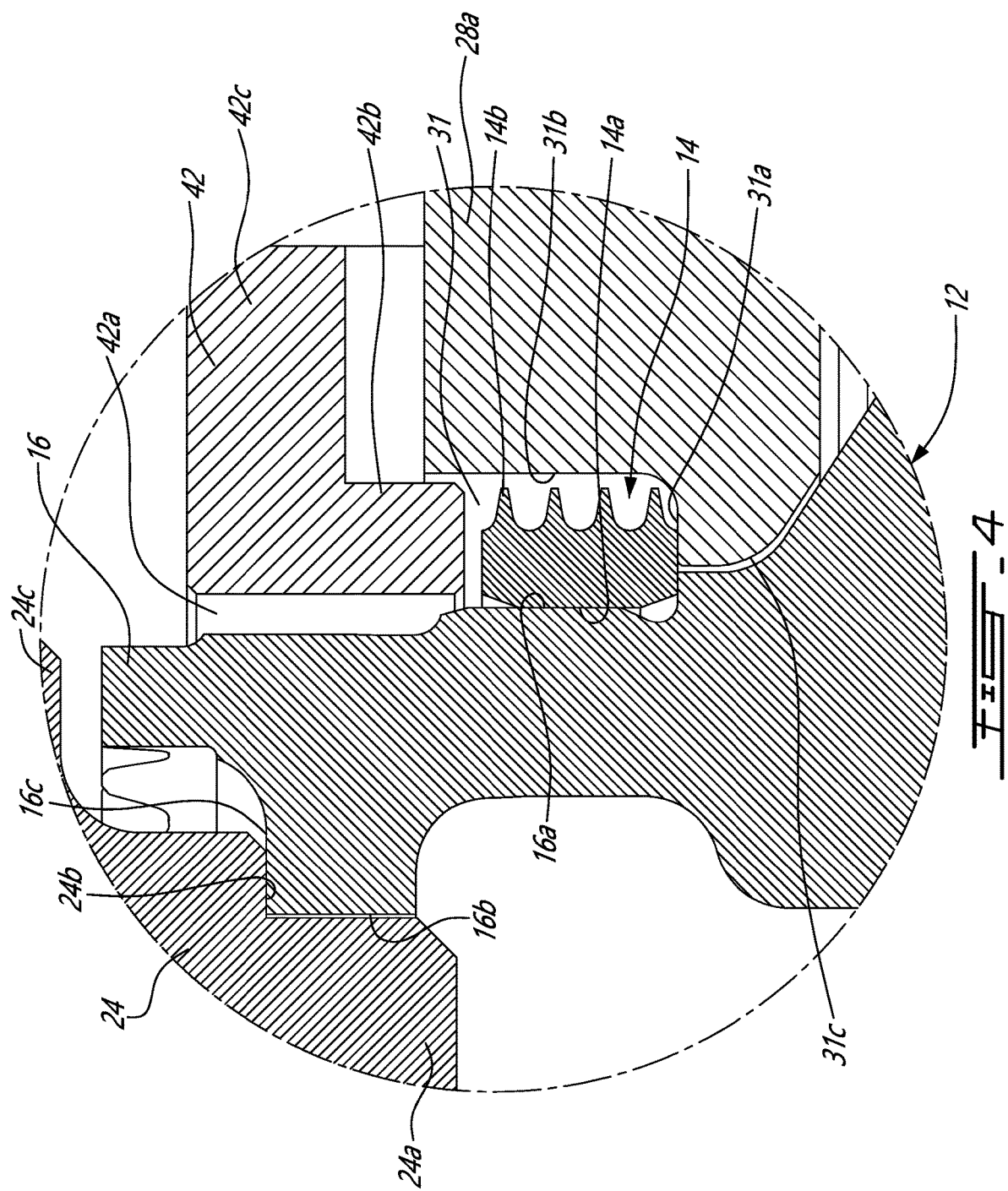
FIG. 4 is an enlarged view of a portion of FIG. 3 illustrating how the labyrinth seal is supported by the tool.

FIGS. 2-4 illustrate an embodiment of a tool 20 for facilitating the separation of the lab seal 14 from the turbine disc 12, while mitigating the risk of damaging the turbine disc 12 and the lab seal 14 during the disassembly process. As will be seen hereinafter, the tool 20 is configured to restrain or block the axial movement the lab seal 14 in a first axial direction F1 (downward direction in the example depicted in FIG. 3) while a predetermined calibrated pushing force or press load is applied onto the disc 12 in the first axial direction to disengage the disc 12 from the lab seal 14.

The tool 20 generally comprises a support 22 for holding the disc and lab seal assembly by the lab seal 14 and a pusher 24 for applying an axial force onto the disc 12 while the lab seal 14 is axially restrained by the support 22 from moving in the direction of the pushing force (i.e. axial direction F1). As best shown in FIG. 3, the support 22 may be configured to support the disc and lab seal assembly in a vertical orientation. According to the illustrated embodiment, the support 22 is configured to hold the turbine disc 12 in suspension via the lab seal 14.

According to one or more embodiments, the support 22 generally comprises a base 26 and shell halves 28a, 28b. The shell halves 28a, 28b are adapted to be pre-assembled onto the disc 12 around the lab seal 14. As shown in FIG. 3, the shell halves 28a, 28b are engageable around the lab seal 14 on the OD surface 16a of the spigot 16 of the turbine disc 12. The shell halves 28a, 28b jointly define a central annular seat around a central bore when joined along their central split line. According to one or more embodiments, the central annular seat may be provided in the form of a counterbore 31 or the like centrally defined in the top surface of the shell halves 28a, 28b. As shown in FIG. 4, the bottom annular wall 31a of the counterbore 31 offers an axial abutment or axial arresting surface for the lab seal 14 around the OD surface 16a of the spigot 16 of the disc 12. The bottom annular wall 31a thus acts as an axial stopper for the lab seal 14. The cylindrical wall 31b of the counterbore 31 is configured to surround the lab seal 14 when the lab seal 14 rests on the bottom wall 31a of the counterbore 31. As shown in FIG. 4, the counterbore 31 is sized to provide a radial gap or play between the distal end of the lab seal teeth 14b and the cylindrical wall 31b. As shown in FIGS. 3 and 4, the innermost diameter surface 31c of the adjoining shell halves 28a, 28b may have a contour that generally follows the profile of the disc 12 at the junction between the spigot 16 and the hub 18 of the turbine disc 12. The innermost diameter surface 31c is sized and shaped to provide a play or gap between the shell halves 28a, 28b and the turbine disc 12. This allows the lab seal and disc assembly to be axially supported solely from the lab seal on the support 22. That is the lab seal and disc assembly is hung by the lab seal 14 on the support 22. The shell halves 28a, 28b may be made of metal or another suitable high strength material. For instance, the shell halves 28a, 28b can be made out of alloy steel. As shown in FIG. 2, axial holes 33 may extend thicknesswise through the shell halves 28a, 28b to increase their stiffness and reduce their weight.

As can be appreciated from FIGS. 2 and 3, the base 26 may be provided in the form of a cylindrical metal enclosure having a top-open end. The base 26 defines an open-ended interior chamber 30 sized to accommodate the turbine disc 12 in a vertical orientation. The shell halves 28a, 28b, when united around the lab seal 14 on the turbine disc 12, form a disc-shaped lab seal capping structure, which seats in a corresponding cylindrical recess/seat 32 formed at the top end of the base 26. From FIG. 3, it can be appreciated that the cylindrical recess 32 has an annular bottom surface 32a against which the shell halves 28a, 28b rest. The joined shell halves 28a, 28b are, thus, uniformly supported along their outer circumference on top of the interior chamber 30 of the base 26. Pins 34 or the like may be engaged with the base 26 and the shell halves 28a, 28b to ensure proper positioning of the shell halves 28a, 28b on the base 26 and to restrict angular movement therebetween around the central axis A. According to the illustrated embodiment, the pins 34 include a pair of diametrically opposed tubular pins. Each pin 34 is engaged in a mating hole 35a, 35b defined in the outer diameter surface of each of the shell halves 28a, 28b. The pins 34 extend outwardly from the shell halves 28a, 28b for engagement in corresponding semi-circular recesses 36 (FIG. 2) defined at diametrically opposed locations in the top surface of the top circular lip 39 of the base 26.

As shown in FIG. 3, the interior surface of the base 26 may be lined with any proper padding or protective material to protect the disc 12 when pushed out from engagement with the lab seal by the pusher 24. For instance, the bottom surface 40 of the interior chamber 30 may be lined with a rubber pad 38 or other suitable shock absorbing material. An adhesive may be provided between the rubber pad 38 and the bottom surface 40. A central hole 45 may be defined through the rubber pad 38 and the bottom surface 40 to receive the lower end portion of the disc 12 when disengaged from the lab seal 14. The cylindrical sidewall of the interior chamber 30 may also be lined with a protective sleeve 41. The protective sleeve 41 may be made of a thermoplastic or other equivalent high impact strength materials. For instance, the protective sleeve 41 may be made out of High Density Polyethylene (HDPE).

Referring jointly to FIGS. 2 and 3, it can be seen that the support 22 may further include a cap 42 releasably securable to the base 26 on top of the shell halves 28a, 28b and the lab seal 14. Mechanical fasteners, such as threaded fasteners 44, may be used to releasably secure the cap 42 to the base 26. According to the illustrated embodiment, the threaded fasteners 44 are provided in the form of knurled knobs with threaded shanks for threaded engagement with corresponding threaded holes defined in the top surface of the base 26. According to the illustrated embodiment, the cap 42 extends longitudinally along the split line of the shell halves 28a, 28b. The attachment of the cap 42 over the shell halves 28a, 28b and the lab seal 14 prevents that lab seal 14 and the shell halves 28a, 28b from popping out of the base 26 when the turbine disc 12 is axially pushed downward into the interior chamber 30 of the base 26 by the pusher 24. As shown in FIGS. 2-4, the cap 42 defines a central hole 42a in registry with the counterbore 31 in the top surface the shell halves 28a, 28b. The central hole 42a is sized to loosely accommodate the distal end portion of the disc spigot 16. As can be appreciated from FIGS. 3 and 4, the distal end portion of the disc spigot 16 projects axially out of the central hole 42a of the cap 42 when the lab seal and disc assembly are installed in position on the base 26. This allows the pusher 24 to be subsequently axially engaged with the disc 12.

As shown in FIGS. 3 and 4, the cap 42 has a central hollow cylindrical projection 42b extending from a bottom surface thereof. The central hole 42a of the cap extends through the central cylindrical projection 42b. The central projection 42b is axially engageable in the upper portion of the counterbore 31 formed in the top surface the shell halves 28a, 28b. As shown in FIG. 4, the length of the central projection 42b is selected to maintain a small axial gap between the upper end of the lab seal 14 and the central projection 42b of the cap 42 when the cap 42 is mounted to the base 26. The central projection 42b acts as a stopper for preventing the lab seal 14 from popping out of the shell halves 28a, 28b when the disc 12 is pushed by the pusher 24 into the chamber 30 of the base 26. Likewise, the cap lateral longitudinal side portions 42c that extend laterally from the central projection 42b over the top surface of the shell halves 28a, 28b acts as a stopper for preventing unintentional removal of the shell halves 28a, 28b from the top of the base 26.

Still referring to FIGS. 2-4, it can be seen that the pusher 24 has a body including a central axially extending male portion 24a slidably axially engageable in a central bore 16b extending through the distal end portion of the disc spigot 16. The engagement of the male portion 24a with the wall surface circumscribing the central bore 16b allows to properly axially align the pusher 24 with the central axis (A) of the turbine disc 12. In this way, the disc 12 can be pushed in a substantially pure axial direction. The term "substantially" is herein intended to encompass slight angular variations that would not induce damage to the parts when the disc is pushed. For instance, a deviation of 5 degrees could be acceptable in some applications. It is also understood that other suitable aligning features could be used.

The body of the pusher 24 further has an annular shoulder 24b extending around the male portion 24a for axial abutment against a corresponding inner annular shoulder 16c of the disc spigot 16. The axial engagement of the shoulders 16c and 24b allows to transfer an axially directed pushing force from the pusher 24 to the disc 12.

As shown in FIGS. 2-3, the pusher 24 may also include a collar 24c to act as a stopper for limiting axial travel of the pusher 24 in the pushing direction F1 (vertically downward direction in the embodiment of FIG. 3). The collar 24c can be provided as a separate annular part adapted to be mounted on a shoulder formed at an upper end portion of the body of the pusher 24. According to one embodiment, the body of the pusher 24 can be made from a block of metal, such as alloy steel, and the collar 24c can be made of High Density Polyethylene. Suitable fasteners may be used to secure the collar 24c to the body of the pusher 24. According to another embodiment, the collar 24c could be integrally formed with the body of the pusher 24. The collar 24c is sized to overlap the top surface of the cap 42 to thereby physically limit the depth of insertion of the pusher 24 into the central hole 42a of the cap 42.

According to one possible disassembly process, the turbine disc 12 is first removed from the turbine section 10. Then, the turbine blades 13 are removed from the turbine disc 12. To reduce the force required to remove the lab seal 14 and mitigate the risk of tool and/or disk damage, the lab seal 14 may be lubricated with a penetrating fluid (e.g. oil.). Furthermore, the lab seal 14 may be heated with a heating device, such as a heat gun. According to one or more embodiments, the heating device is set up to 500 degrees Celsius for a minimum of 15 minutes to a maximum of 20 minutes, maintaining a 1.0" to a 1.5" gap between tip of the heat gun and the engine components. During the heating process, a relative circular motion between the heat gun and the lab seal 14 is provided to ensure uniform heating along the entire circumference of the lab seal 14. The thermal treatment may also include cooling the turbine disc spigot.

After the thermal treatment, the shell halves 28a, 28b are pre-assembled onto the disc spigot 16 around the lab seal 14 so that the end surface of the lab seal 14 facing the hub 18 is axially abutted against the bottom wall 31a of the counterbore 31 formed in the top surface of the shell halves 28a, 28b. The lab seal and disc assembly is then installed in a vertical orientation on the base 26 by lowering the assembly so as to seat the shell halves 28a, 28b on the associated seat 32 on the base 26, thereby hanging the turbine disc 12 by the lab seal 14. As shown in FIG. 3, at this stage of the procedure, the vertically oriented turbine disc 12 is held in suspension in the interior chamber 30 of the base 26. Thereafter, the cap 42 is secured to the base 26 in position over the lab seal 14 and the shell halves 28a, 28b. The pusher 24 is then coaxially aligned with the turbine disc 12 by axially slidably engaging the male projection 24a of the pusher 24 into the bore 16b at the upper end of the disc spigot 16. Then, a press (not shown), such as a hydraulic or pneumatic press is used to apply a pushing force to the top of the pusher 24 in the axial direction F1 (a vertically downward force according to the embodiment illustrated in FIG. 3). According to one or more embodiment, the press may be of the arbor or H-frame type. Still according to one or more embodiments, the press force is set between 3800-6700 LBF (16900-29800 N). The pushing force of the press is transferred to the turbine disc 12 by the pusher 24. As the lab seal 14 is axially restrained by the bottom wall 31a of the counterbore 31 of the shell halves 28a, 28b, which are, in turn, seated at the top of the base 26, the disc 12 will be pushed out of engagement from the lab seal 14, which will remain trapped between the shell halves 28a, 28b. The disengaged disc will rest on the padding 38 on the bottom surface 40 of the chamber 30 of the base 26.

It can thus be appreciated that according to at least some embodiments, the tooling mitigates the risk that the disc 12 and the lab seal 14 be damaged. It may thus allow the lab seal 14 to be reused if serviceable. Also, it may facilitate the removal of damaged lab seals with worn out teeth.

Figure 5:
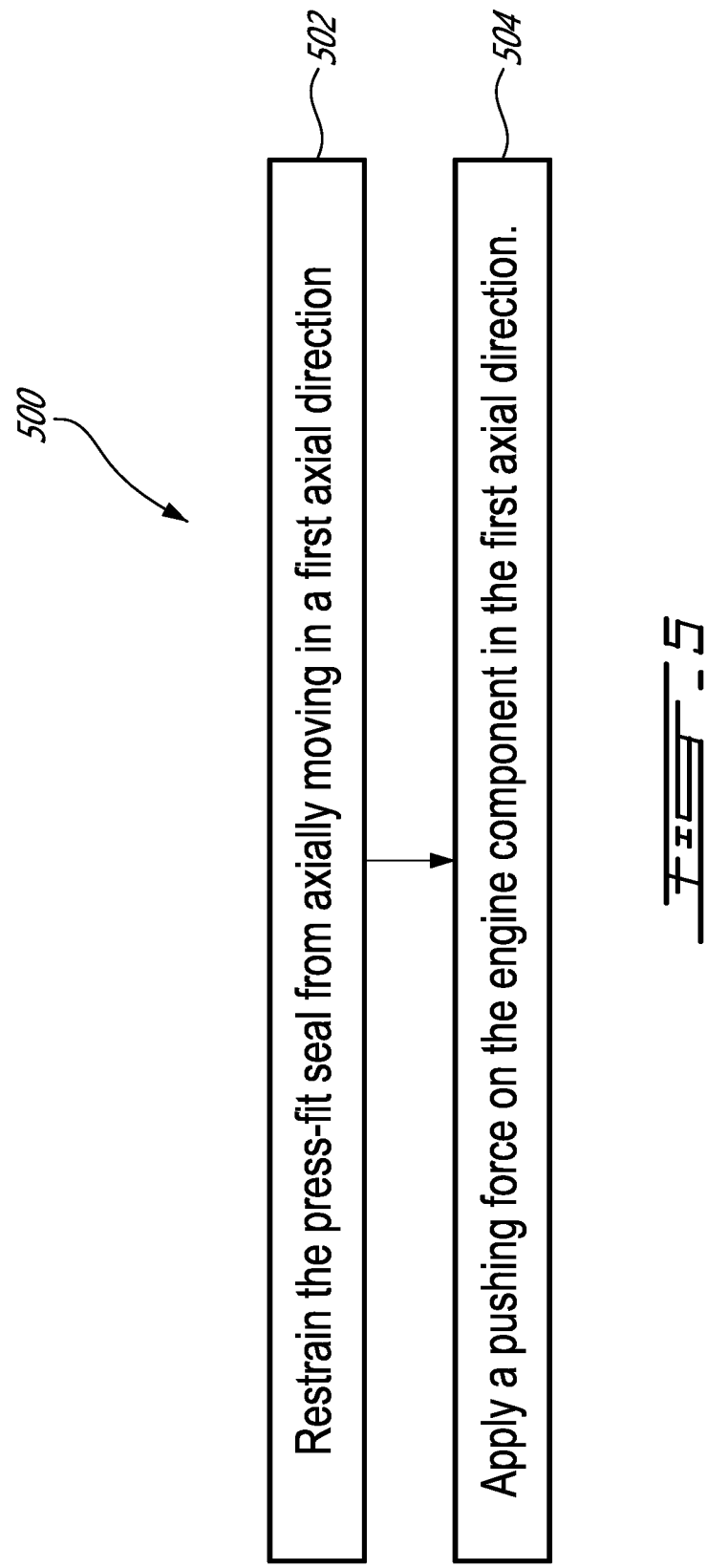
FIG. 5 is a flow chart of a method for the disassembly of press-fit components in accordance with one embodiment.

According to one embodiment shown in FIG. 5, there is provided a method 500 for removing a press-fit seal from an engine component having a central axis. As indicated at 502, the method 500 comprises restraining the press-fit seal from axially moving in a first axial direction. Then at 504, the method 500 further comprises applying a pushing force on the engine component in the first axial direction. It is understood that, the first axial direction does not necessarily need to be vertical as exemplified in FIG. 3.

The method 500 may entail positioning an abutment surface axially behind the press-fit seal relative to the first axial direction.

According to another aspect, the positioning of the abutment surface axially behind the press-fit seal may comprise assembling shell halves around the press-fit seal on the engine component, and then seating the shell halves in a corresponding seat at a top end of a base.

According to a further aspect, the method 500 may comprise hanging the engine component by the press-fit seal.

The method 500 may further comprise capturing the engine component in an enclosure formed by the base, the engine component held in a vertical orientation from a top end of the enclosure via the shell halves.

The method 500 may also include applying a heat treatment to at least one of the press-fit seal and the engine component prior to pushing the engine component.

Still according to one aspect of the method 500, the pushing force is set between 3800-6700 LBF (16900-29800 N).

Figure 6:
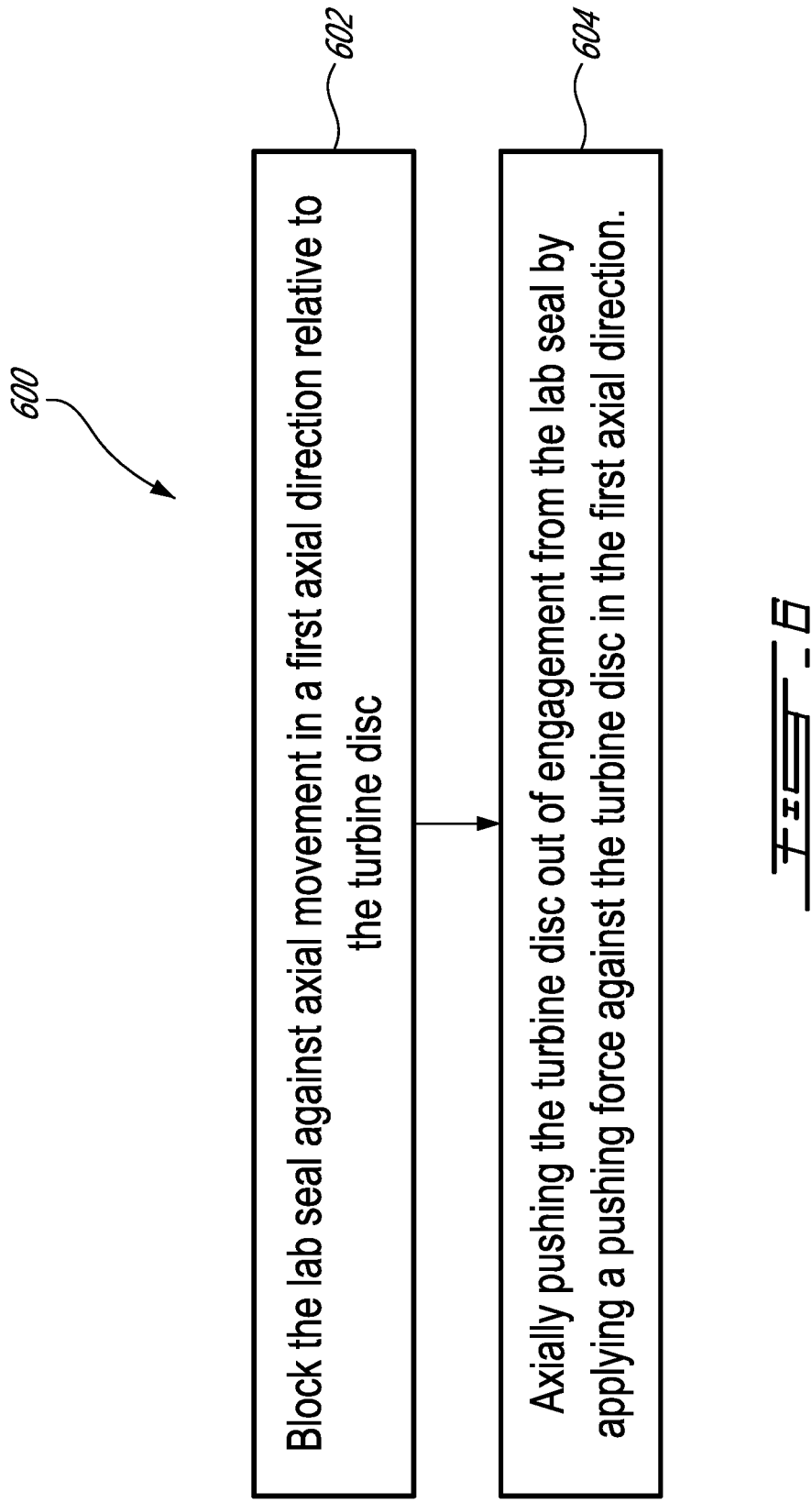
FIG. 6 is a flow chart of a method for the disassembly of a lab seal from a turbine disc in accordance with another embodiment.

FIG. 6 is a flow chart of another method 600 for removing a lab seal (e.g. lab seal 14) from a turbine disc, the lab seal having an interference fit with a turbine disc. The method 600 comprises at 602 blocking the lab seal against axial movement in a first axial direction relative to the turbine disc. As indicated at 604, the method 600 further comprises axially pushing the turbine disc out of engagement from the lab seal by applying a pushing force against the turbine disc in the first axial direction.

According to one or more embodiments, blocking the lab seal may comprise assembling shell halves around the lab seal and hanging the turbine disc via the shell halves. Still according to some embodiments, axially pushing the turbine disc out of engagement from the lab seal may comprise axially engaging a male portion of a pusher into a central bore extending through the turbine disc.

The embodiments described in this document provide non-limiting examples of possible implementations of the present technology. Upon review of the present disclosure, a person of ordinary skill in the art will recognize that changes may be made to the embodiments described herein without departing from the scope of the present technology. For instance, while, the above tooling and disassembly procedure has been described in the context of a lab seal and a turbine disc, it is understood that the present technology could be applied to other press-fit components.

The invention claimed is:

1. A tool for removing a seal from an engine component, wherein an interference fit is provided between an inner diameter (ID) surface of the seal and an outer diameter (OD) surface of the engine component, the ID surface and the OD surface extending circumferentially around a central axis, the tool comprising:
   a support defining an annular seat offering an axial abutment for the seal around the OD surface of the engine component, the axial abutment restraining axial movement of the seal in a first axial direction, the support including:
      a base defining an enclosure for receiving the engine component,
      shell halves engageable around the seal on the OD surface of the engine component, the shell halves seated on the base, the shell halves jointly forming the annular seal, and
      a cap releasably securable to the base over the shell halves, the cap having a central projection defining a central hole in registry with a counterbore formed by the shell halves, the central projection engageable in the counterbore; and
   a pusher axially engageable with the engine component to transfer a pushing force to the engine component in the first axial direction.

2. The tool according to claim 1, wherein the axial abutment is defined by a bottom wall of the counterbore formed by the shell halves, the counterbore having a cylindrical wall configured to surround the seal when the seal rests on the bottom wall of the counterbore.

3. The tool according to claim 1, wherein pins are engageable with the shell halves and the base to at least one of:
   maintain the shell halves in a proper position relative to the base; or
   restrict angular movement between the shell halves around the central axis.

4. The tool according to claim 1, wherein the cap has opposed longitudinal side portions extending laterally beyond the counterbore over the top surface of the shell halves.

5. The tool according to claim 1, wherein at least a portion of an interior surface of the enclosure is lined with a protective padding.

6. The tool according to claim 1, wherein the pusher has a male portion slidably axially engageable in a central bore extending through a first end of the engine component, and an annular shoulder extending around the male portion for abutment against a corresponding annular shoulder of the engine component.

7. The tool according to claim 1, wherein the pusher has a collar acting as a stopper for limiting axial travel of the pusher in the first axial direction.

* * * * *